US012792899B2

(12) United States Patent
Lee et al.

(10) Patent No.: US 12,792,899 B2
(45) Date of Patent: Nov. 10, 2026

(54) APPARATUS AND METHOD WITH NEURAL NETWORK WITH ANALOG-DIGITAL CONVERSION SCALING

(71) Applicants: Samsung Electronics Co., Ltd., Suwon-si (KR); UNIST(Ulsan National Institute Of Science And Technology), Ulsan (KR)

(72) Inventors: Jongeun Lee, Ulsan (KR); Azat Azamat, Ulsan (KR)

(73) Assignees: Samsung Electronics Co., Ltd., Suwon-si (KR); UNIST(Ulsan National Institute Of Science And Technology), Ulsan (KR)

(*) Notice: Subject to any disclaimer, the term of this patent is extended or adjusted under 35 U.S.C. 154(b) by 860 days.

(21) Appl. No.: 17/877,090

(22) Filed: Jul. 29, 2022

(65) Prior Publication Data

US 2023/0029509 A1 Feb. 2, 2023

(30) Foreign Application Priority Data

Jul. 30, 2021 (KR) ........................ 10-2021-0100912
Nov. 22, 2021 (KR) ........................ 10-2021-0161287

(51) Int. Cl.
*G06N 3/065* (2023.01)

(52) U.S. Cl.
CPC .................................... *G06N 3/065* (2023.01)

(58) Field of Classification Search
CPC ........ G06N 3/065; G06N 3/0495; G06N 3/08; G36N 3/063; G11C 11/54; H03M 1/18; H03M 1/36
USPC ........................................................... 706/15
See application file for complete search history.

(56) References Cited

U.S. PATENT DOCUMENTS 9,910,827 B2 3/2018 Muralimanohar et al.
2009/0160490 A1* 6/2009 Choi ....................... H03M 1/08 327/51
2020/0272795 A1* 8/2020 Kenney ................... G06J 1/005

FOREIGN PATENT DOCUMENTS

JP 2021-5211 A 1/2021
KR 10-1884114 B1 7/2018
KR 10-2019-0093932 A 8/2019
KR 10-2020-0124705 A 11/2020
KR 10-2021-0049179 A 5/2021

(Continued)

OTHER PUBLICATIONS

Lin, Jilan, et al. "Learning the sparsity for ReRAM: Mapping and pruning sparse neural network for ReRAM based accelerator." *Proceedings of the 24th Asia and South Pacific Design Automation Conference*. (2019). pp. 1-6.

(Continued)

*Primary Examiner* — April Y Blair
(74) *Attorney, Agent, or Firm* — NSIP Law

(57) ABSTRACT

An apparatus includes: a random-access memory (RAM) configured to generate an analog output signal based on an input and a weight of a neural network, the RAM including a crossbar array structure, an analog-to-digital converter (ADC) circuit configured to generate a digital output signal based on a reference signal and the analog output signal of the RAM, a first ADC scaler configured to scale the reference signal of the ADC circuit, and a second ADC scaler configured to scale the digital output signal generated by the ADC circuit.

19 Claims, 7 Drawing Sheets

(56) References Cited

FOREIGN PATENT DOCUMENTS

KR 10-2021-0060146 A 5/2021

OTHER PUBLICATIONS

Sun, Xiaoyu, et al. "XNOR-RRAM: A scalable and parallel resistive synaptic architecture for binary neural networks." *2018 Design, Automation & Test in Europe Conference & Exhibition* (Date). IEEE, (2018). pp. 1-6.
Kim, Yulhwa, et al. "Neural network-hardware co-design for scalable RRAM-based BNN accelerators." arXiv preprint arXiv:1811.02187 vol. 2 (2018). pp. 1-6.
Shafiee, Ali, et al. "ISAAC: A convolutional neural network accelerator with in-situ analog arithmetic in crossbars." *ACM SIGARCH Computer Architecture News* vol. 44. Issue 3 (2016). pp. 1-13.
Chen, Xizi, et al. "A High-Throughput and Energy-Efficient RRAM-based Convolutional Neural Network using Data Encoding and Dynamic Quantization" *The Hong Kong University of Science & Technology* (2018). pp. 1-37.
Zhu, Zhenhua, et al. "Mixed size crossbar based RRAM CNN accelerator with overlapped mapping method." *2018 IEEE/ACM International Conference on Computer-Aided Design* (*ICCAD*). IEEE, (2018). pp. 1-8.
Yang, Tzu-Hsien, et al. "Sparse reram engine: Joint exploration of activation and weight sparsity in compressed neural networks." *Proceedings of the 46th International Symposium on Computer Architecture*. (2019). pp. 236-249.
Ankit, Aayush, et al. "Panther: A programmable architecture for neural network training harnessing energy-efficient reram." *IEEE Transactions on Computers* vol. 69. Issue 8 (2020). pp. 1128-1142.
Kim, Jaehyun, et al. "Vcam: Variation compensation through activation matching for analog binarized neural networks." *2019 IEEE/ACM International Symposium on Low Power Electronics and Design* (*ISLPED*). IEEE, 2019. pp. 1-6.
Esser, Steven K., et al. "Learned step size quantization." *arXiv preprint* arXiv:1902.08153 vol. 3 (2019). pp. 1-12.
Hubara, I., et al. "Binarized neural networks: Training neural networks with weights and activations constrained to+ 1 or− 1." arXiv preprint arXiv:1602.02830 vol. 3 (2016). pp. 1-11.
He, Kaiming, et al. "Deep residual learning for image recognition." *Proceedings of the IEEE conference on computer vision and pattern recognition*. (2016). pp 770-778.
Korean Office Action Issued on Nov. 29, 2024, in Counterpart Korean Patent Application No. 10-2021-0161287 (2 Pages in English, 5 Pages in Korean).

* cited by examiner

APPARATUS AND METHOD WITH NEURAL NETWORK WITH ANALOG-DIGITAL CONVERSION SCALING

CROSS-REFERENCE TO RELATED APPLICATIONS

This application claims the benefit under 35 USC § 119(a) of Korean Patent Application No. 10-2021-0100912, filed on Jul. 30, 2021, and Korean Patent Application No. 10-2021-0161287, filed on Nov. 22, 2021, in the Korean Intellectual Property Office, the entire disclosures of which are incorporated herein by reference for all purposes.

BACKGROUND

1. Field

The following description relates to an apparatus and method with a neural network.

2. Description of Related Art

A resistive random-access memory (ReRAM) crossbar array (RCA) may enable an efficient calculation of matrix-vector multiplication (MVM) operations that are the basis of RCA-based deep neural network (DNN) accelerators. The RCA-based DNN accelerators may have an architecture in which a computation is immediately performed in a position where data is stored, and implement all synaptic elements as dedicated hardware, thereby providing high throughput.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes: a random-access memory (RAM) configured to generate an analog output signal based on an input and a weight of a neural network, the RAM including a crossbar array structure; an analog-to-digital converter (ADC) circuit configured to generate a digital output signal based on a reference signal and the analog output signal of the RAM; a first ADC scaler configured to scale the reference signal of the ADC circuit; and a second ADC scaler configured to scale the digital output signal generated by the ADC circuit.

The first ADC scaler and the second ADC scaler may have a same scale factor.

For the scaling of the reference signal, the first ADC scaler may be configured to adjust a reference voltage corresponding to the reference signal by dividing the reference voltage by a scale factor in an analog domain.

For the scaling of the digital output signal, the second ADC scaler may be configured to adjust the digital output signal by multiplying the digital output signal by the scale factor in a digital domain.

For the scaling of the reference signal, the first ADC scaler may be configured to scale the reference signal by adjusting a reference voltage applied to resistors connected in series.

The second ADC scaler may include a digital multiplier configured to output a result obtained by multiplying the digital output signal of the ADC circuit by a scale factor.

The ADC circuit may include a plurality of comparators to which the analog output signal and different reference signals are input, and each of the comparators may be configured to output a binarized output value based on a comparison result between the analog output signal and the reference signal.

The input and the weight may be individually quantized and split to correspond to the crossbar array structure of the RAM.

For the generating of the analog output signal, the RAM may be configured to generate partial sums of analog values generated by an operation between the input and the weight that are individually quantized and split.

For the generating of the digital output signal, the ADC circuit may be configured to: convert the partial sums of the analog values into digital values to generate partial sums of the digital values; and accumulate the partial sums of the digital values to generate the digital output signal.

A scale factor of the first ADC scaler and a scale factor of the second ADC scaler may be derived by a quantization scheme.

The RAM may be a resistive RAM (ReRAM).

In another general aspect, a processor-implemented method includes: receiving an input and a weight of a neural network; generating, using a random-access memory (RAM) including a crossbar array structure, an analog output signal based on the input and the weight; generating, using an analog-to-digital (ADC) circuit, a digital output signal based on a reference signal scaled by a first ADC scaler and the analog output signal of the RAM; and performing, using a second ADC scaler, scaling on the digital output signal generated by the ADC circuit.

The first ADC scaler and the second ADC scaler may have a same scale factor.

The method may include generating, using the first ADC scaler, the scaled reference signal by dividing the reference signal by a scale factor in an analog domain.

The performing of the scaling on the digital output signal may include adjusting the digital output signal by multiplying the digital output signal by a scale factor in a digital domain.

The generating of the analog output signal may include generating partial sums of analog values generated by an operation between the input and the weight that are individually quantized and split.

The generating of the digital output signal may include: converting the partial sums of the analog values into digital values to generate partial sums of the digital values; and accumulating the partial sums of the digital values to generate the digital output signal.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus includes: a neural processor configured to: generate an analog output signal based on an input and a weight of a neural network; scale a reference signal; generate a digital output signal based on the scaled reference signal and the analog output signal of the RAM; and scale the digital output signal generated by the ADC circuit.

For the generating of the analog output signal, the neural processor may include a random-access memory (RAM), including a crossbar array structure, configured to generate the analog output signal, and for the generating of the digital output signal, the neural processor may include an analog-to-digital converter (ADC) circuit configured to generate the digital output signal.

For the scaling of the reference signal and the digital output signal, the neural processor may be configured to scale the reference signal and the digital output signal by a same scale factor.

The weight may be a trained weight trained based on the scale factor.

Other features and aspects will be apparent from the following detailed description, the drawings, and the claims.

Figure 1:
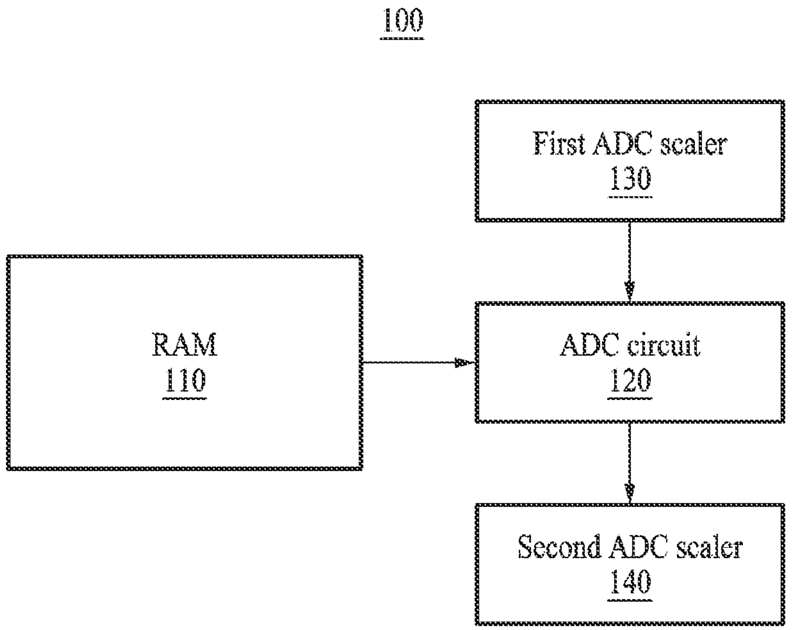
FIG. 1 is a block diagram illustrating an example of configurations of a neural network apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms such as "first," "second," and "third" are used to explain various members, components, regions, layers, or sections, these members, components, regions, layers, or sections are not to be limited by these terms. Rather, these terms should be used only to distinguish one member, component, region, layer, or section from another member, component, region, layer, or section. For example, a "first" member, component, region, layer, or section referred to in the examples described herein may also be referred to as a "second" member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Examples described herein may be applied to a deep learning hardware device based on an in-memory computing, or a hardware device (e.g., an artificial intelligence hardware application or a signal processing chip) using a matrix-vector multiplication (MVM) by an in-memory computing scheme. For simplicity of description herein, examples are illustrated based on a resistive random-access memory (ReRAM), but may be applied to all examples using another type of a memory (e.g., a static RAM (SRAM), a dynamic RAM (DRAM), a phase-change RAM (PRAM), a magnetoresistive RAM (MRAM) or a ferroelectric RAM (FeRAM)) that has a crossbar array (CA) structure and performs an analog operation (e.g., an analog addition).

Hereinafter, examples will be described in detail with reference to the accompanying drawings. When describing the examples with reference to the accompanying drawings, like reference numerals refer to like components and a repeated description related thereto will be omitted.

FIG. 1 is a block diagram illustrating an example of configurations of a neural network apparatus.

Referring to FIG. 1, a neural network apparatus 100 may be a hardware device implementing a neural network by an in-memory computing scheme. For example, the neural network apparatus 100 may be or include a neural network accelerator (e.g., a neural processor) that is optimized and configured to process a workload of the neural network. The neural network apparatus 100 may perform an operation by using a random-access memory (RAM) 110 having a crossbar array structure.

The neural network apparatus 100 may include the RAM 110, an analog-to-digital converter (ADC) circuit 120, a first ADC scaler 130, and a second ADC scaler 140.

The RAM 110 may generate an analog output signal based on an input and a weight. The weight may belong to a parameter of the neural network implemented by the neural network apparatus 100. Each of the input and the weight may be quantized (or binarized) and split to correspond to the crossbar array structure of the RAM 110. The input and the weight that are individually quantized and split may be input to the RAM 110, and partial sums of analog values generated by an operation between the input and the weight that are individually quantized and split may be generated.

The RAM 110 may be, for example, a ReRAM, but is not limited thereto, and may be other types of memories having the crossbar array structure. The ReRAM may operate in a manner of storing "1" corresponding to a low resistance state or storing "0" corresponding to a high resistance state, by using a resistance change phenomenon observed in transition metal oxides, and may be implemented as a crossbar array structure. The crossbar array structure of one or more embodiments may be driven using two electrodes of a bit line and a word line, without a cell selection transistor for selecting a unit cell that stores data, thereby having an advantage in terms of a degree of integration over a typical RAM or crossbar array structure that includes the cell selection transistor.

The ADC circuit 120 may convert an input analog signal into a digital signal. The ADC circuit 120 may generate a digital output signal based on a reference signal and an analog output signal of the RAM 110. The ADC circuit 120 may convert partial sums of analog values output from the RAM 110 into digital values to generate partial sums of the digital values, and accumulate the partial sums of the digital values to generate the digital output signal. The ADC circuit 120 may include a plurality of comparators to which a corresponding analog output signal and different reference signals are input, and each of the comparators may output a binarized output value based on a comparison result between the analog output signal and the reference signal.

The first ADC scaler 130 may scale the reference signal of the ADC circuit 120. "Scaling" may be adjusting a magnitude of a signal. The first ADC scaler 130 may adjust a reference voltage (e.g., Vref of FIG. 5) corresponding to the reference signal by dividing the reference voltage by a set scale factor in an analog domain. The first ADC scaler 130 may scale the reference signal by adjusting the reference voltage applied to resistors connected in series. The second ADC scaler 140 may scale the digital output signal generated by the ADC circuit 120. The second ADC scaler 140 may adjust the digital output signal by multiplying the digital output signal by a scale factor in a digital domain. The second ADC scaler 140 may include a digital multiplier configured to output a result obtained by multiplying the digital output signal of the ADC circuit 120 by the scale factor, and a digital adder. The first ADC scaler 130 may also be referred to as a "pre-ADC scaler", and the second ADC scaler 140 may also be referred to as a "post-ADC scaler".

As described above, the first ADC scaler 130 may control a signal scale in the analog domain by controlling the reference voltage, and the second ADC scaler 140 may control a signal scale in the digital domain. Both the first ADC scaler 130 and the second ADC scaler 140 may be used such that a quantization parameter such as a scale factor may be realized. The first ADC scaler 130 and the second ADC scaler 140 may have the same scale factor, and thus the neural network apparatus 100 of one or more embodiments may reduce an overhead. The same value may be used as a parameter of each of the first ADC scaler 130 and the second ADC scaler 140. A scale factor of the first ADC scaler 130 and a scale factor of the second ADC scaler 140 may be a scale factor (e.g., an optimal value derived by a quantization theory) that is derived by a quantization scheme, and the scaler factor of the first ADC scaler 130, the scaler factor of the second ADC scaler 140, and the weight input to the RAM 110 may be optimized through the same training process. In the training process, the optimal value of the scale factor of the first ADC scaler 130 and the scale factor of the second ADC scaler 140 may be determined, and a weight applied to the neural network apparatus 100 may be trained based on the determined optimal scale factor.

In-memory computing-based neural network hardware may use an ADC for performing a calculation. In the neural network apparatus 100 of one or more embodiments based on a ReRAM crossbar array (RCA) proposed herein, an operation of an MVM may be performed in the analog domain, and the ADC may be used to convert a result of the operation performed in the analog domain into a digital signal. An ADC of a typical neural network apparatus may occupy a large overhead in terms of an area, energy, and power. In contrast, the neural network apparatus 100 of one or more embodiments may provide a high accuracy while reducing an area of the ADC through the first ADC scaler 130 and the second ADC scaler 140 without a change of hardware, and may significantly reduce the overhead of the ADC.

The neural network apparatus 100 of one or more embodiments may use an optimal scale factor derived by the quantization scheme as a parameter of the ADC circuit 120, and thus the neural network apparatus 100 of one or more embodiments may provide a high calculation accuracy while reducing a size of the ADC in the in-memory computing-based neural network hardware, and may reduce a power consumption and a required area of peripheral circuits (e.g., the ADC circuit 120). The above-described neural network apparatus 100 may be implemented in a form of a chip, or may be (or may be mounted on) a device such as a computer or a mobile phone.

Figure 2:
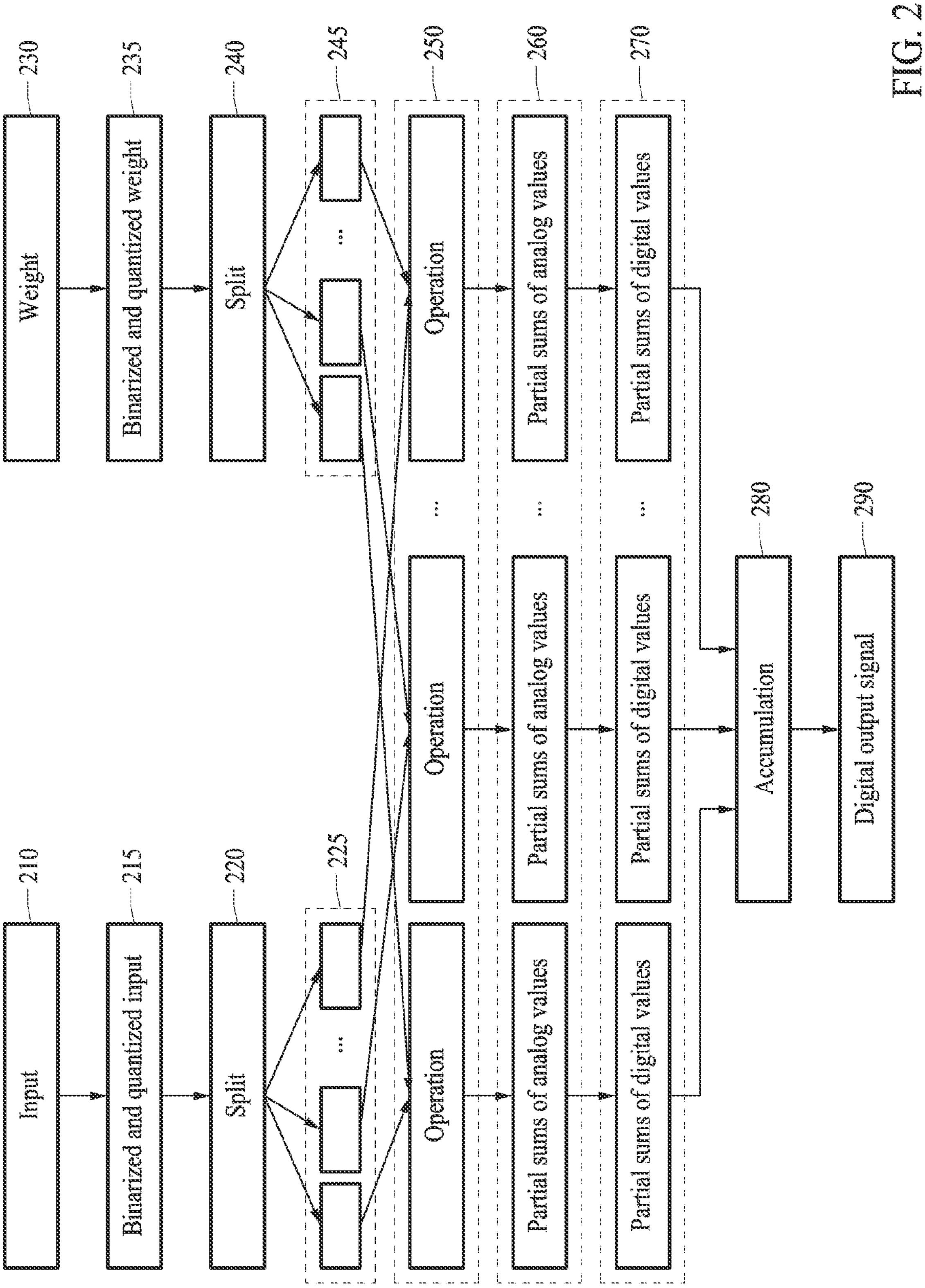
FIG. 2 illustrates an example of a processing process performed in a neural network apparatus.

FIG. 2 illustrates an example of a processing process performed in a neural network apparatus.

Referring to FIG. 2, an input 210 of a neural network layer, and a weight 230 of a neural network may be given in a neural network apparatus (e.g., the neural network apparatus 100 of FIG. 1). The input 210 and the weight 230 may have a tensor data structure that is a data structure of an n-dimensional array.

The input 210 may be binarized and quantized to generate a binarized and quantized input 215. A split 220 may be performed on the binarized and quantized input 215 to correspond to a crossbar array structure of a RAM (the RAM 110 of FIG. 1, as a non-limiting example) included in the neural network apparatus to generate split inputs 225. Similarly, the weight 230 may also be binarized and quantized to generate a binarized and quantized weight 235. A split 240 may be performed on the binarized and quantized weight 235 to correspond to the crossbar array structure of the RAM to generate split weights 245. Each of the binarized and quantized input 215 and the binarized and quantized weight 235 may be split to meet a size of the crossbar array structure of the RAM.

The split inputs 225 and the split weights 245 may be input to the crossbar array structure of the RAM, and an operation 250 may be performed based on the split inputs 225 and the split weights 245 in the RAM. The operation 250 may be performed in an analog domain, and may correspond to, for example, a convolution operation of the neural network. As a result of performing each operation 250, partial sums 260 of analog values may be generated from the RAM, and the partial sums 260 of the analog values may be input to an ADC circuit (the ADC circuit 120 of FIG. 1, as a non-limiting example). The ADC circuit may convert the partial sums 260 of the analog values into digital values to generate partial sums 270 of the digital values. An accumulation 280 may be performed on the generated partial sums 270 of the digital values, to generate a digital output signal 290 corresponding to a final output as a result of the accumulation.

Figure 3:
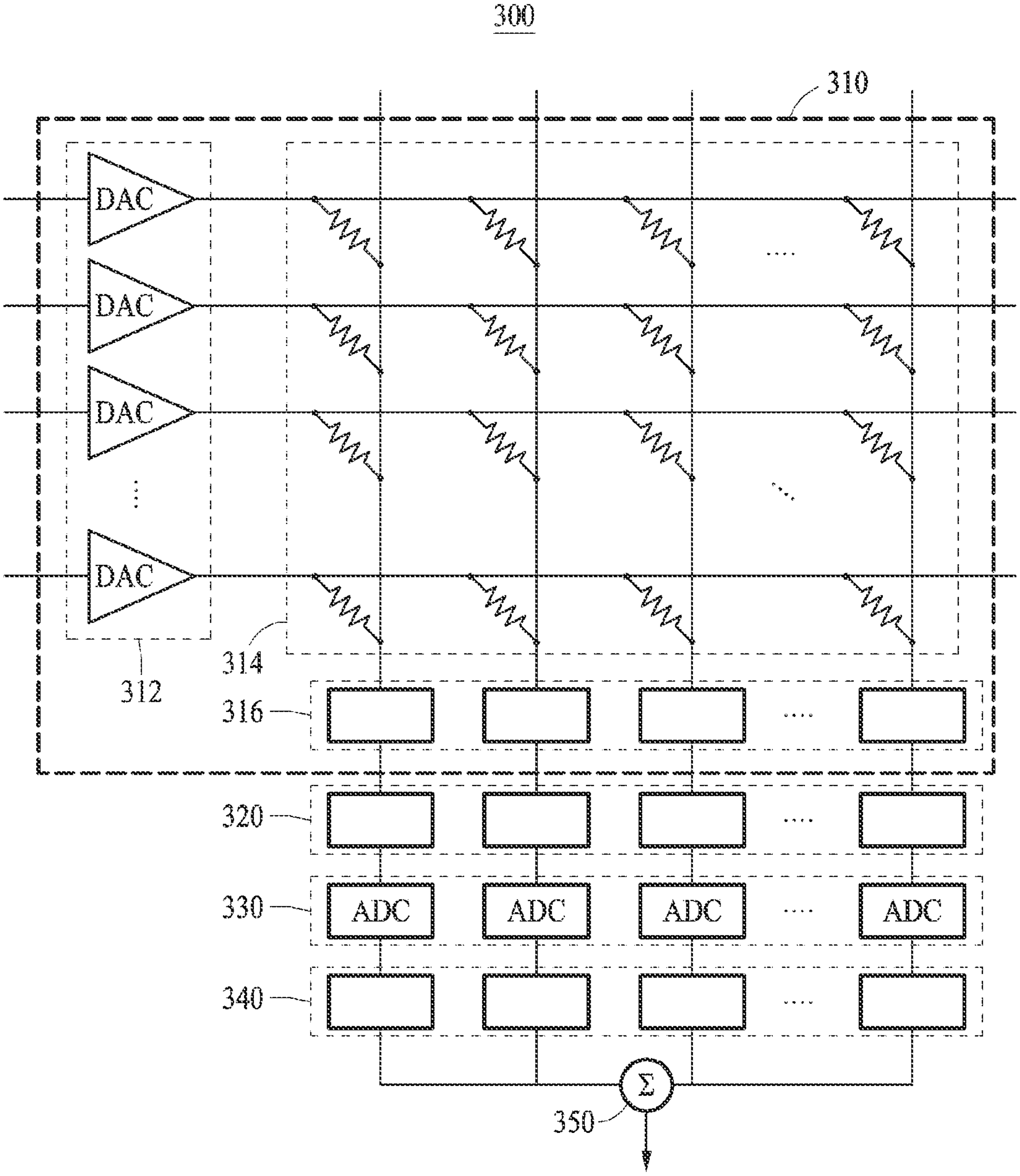
FIG. 3 illustrates an example of a structure of a neural network apparatus including a resistive random-access memory (ReRAM) crossbar array (RCA) structure.

FIG. 3 illustrates an example of a structure of a neural network apparatus including an RCA structure.

Referring to FIG. 3, a structure of a neural network apparatus 300 including an RCA structure is illustrated. The structure of the neural network apparatus 300 may correspond to a structure in which the neural network apparatus 100 of FIG. 1 has a ReRAM 310 as a RAM (the RAM 110 of FIG. 1, as a non-limiting example). The ReRAM 310 may have a compact size and quickly perform an operation.

According to an example, the ReRAM 310 may include digital-to-analog converters (DACs) 312 configured to convert an input of a digital value into an analog value, a crossbar array structure 314 in which data is stored based on whether a resistance state is a low resistance state or a high resistance state, and sample-and-hold circuits 316 configured to sample and hold the analog value in the crossbar array structure 314. The ReRAM 310 may perform an operation between an input that is input to row lines of the ReRAM 310 and a weight that is input to column lines of the ReRAM 310, and generate partial sums of analog values.

The partial sums of the analog values that are outputs of the ReRAM 310 may be transferred to analog multipliers 320 (of the first ADC scaler 130 of FIG. 1, as a non-limiting example), and the analog multipliers 320 may scale the partial sums of the analog values based on a set scale factor. The analog multipliers 320 may multiply the partial sums of the analog values by a scale factor (e.g., 1/s) in an analog domain. ADC circuits 330 (of the ADC circuit 120 of FIG. 1, as a non-limiting example) may convert the partial sums of the analog values into digital values to generate partial sums of the digital values. Digital multipliers 340 (of the second ADC scaler 140 of FIG. 1, as a non-limiting example) may scale the partial sums of the digital values generated in the ADC circuits 330. The digital multipliers 340 may multiply the partial sums of the digital values by a scale factor (e.g., s). An accumulation 350 may be performed on the partial sums of the scaled digital values to generate a final digital output signal.

Figure 4:
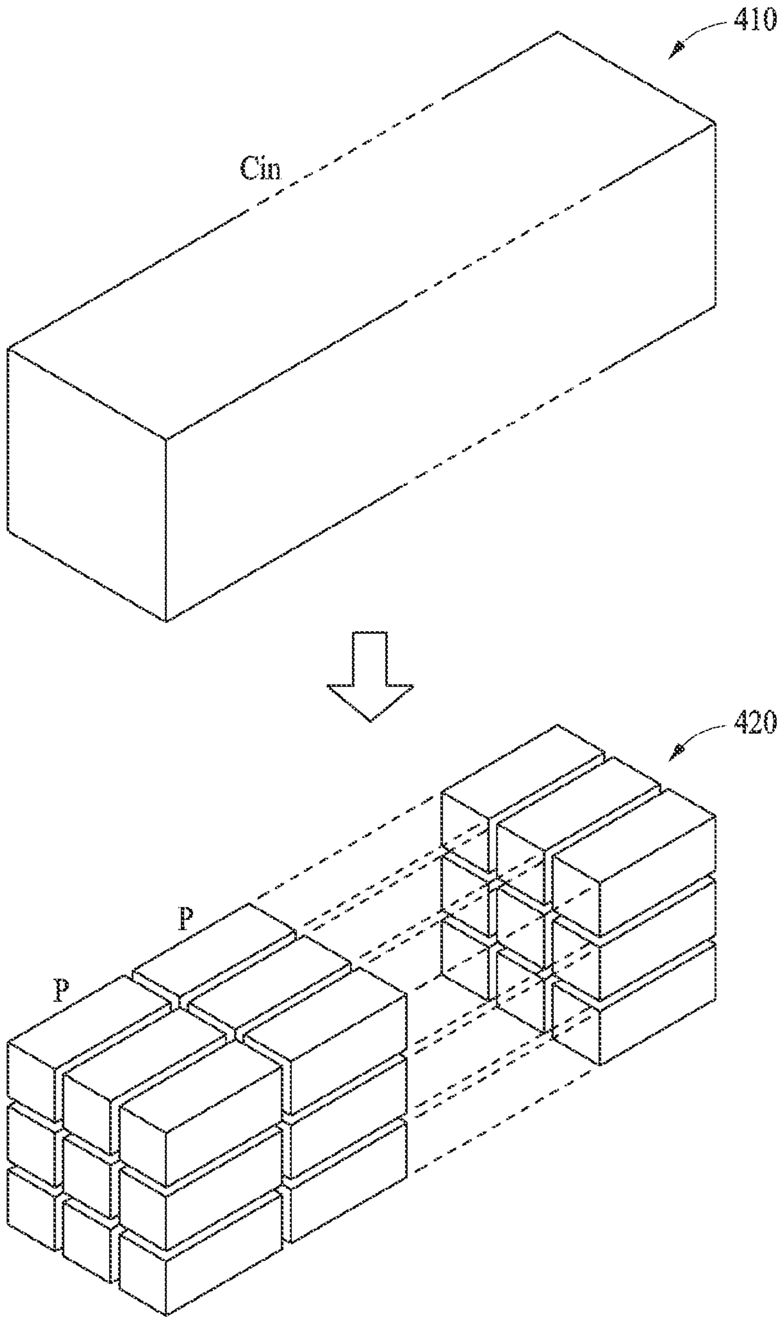
FIG. 4 illustrates an example of splitting a weight.

FIG. 4 illustrates an example of splitting a weight.

Referring to FIG. 4, a weight 410 having a tensor data structure in a convolution layer may be split to correspond to a crossbar array structure of a RAM.

Various methods of mapping the convolution layer to the crossbar array structure may be provided. The methods may vary depending on how to planarize a three-dimensional (3D) structure of the weight 410 and how to map the 3D structure of the weight 410 to input rows of the crossbar array structure. When the convolution layer is mapped to the crossbar array structure, a weight having a tensor data structure may be split into, for example, multiple 1×1 convolutions with "P" input channels or less. A used filter may have a filter size of, for example, K×K (e.g., K=3). Each of weight blocks 420 obtained by splitting the weight 410 may have a form of 1×1×P. Here, P represents a number of input rows of the crossbar array structure, and Cin represents a number of input channels. P×P may correspond to a size of the crossbar array structure.

Figure 5:
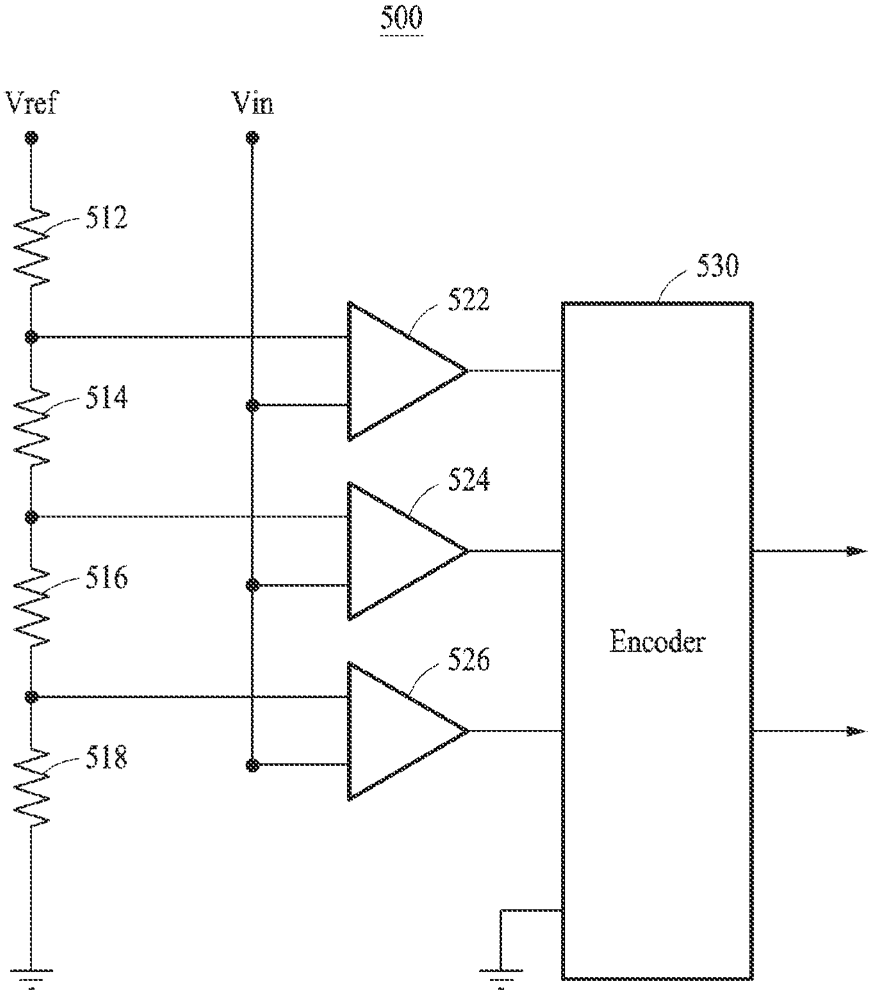
FIG. 5 illustrates an example of an analog-to-digital converter (ADC) circuit.

FIG. 5 illustrates an example of an ADC circuit.

Referring to FIG. 5, a flash ADC circuit is illustrated as an example of an ADC circuit 500 (the ADC circuit 120 of FIG. 1, as a non-limiting example). The ADC circuit 500 may include a plurality of resistors 512, 514, 516, and 518, comparators 522, 524, and 526, and an encoder 530.

In the ADC circuit 500, different voltages may be generated by the resistors 512, 514, 516, and 518, which are connected in series, from a reference signal Vref (e.g., a reference voltage), and each of the difference voltages may be input to the comparators 522, 524, and 526. Voltage values of the different voltages may be determined by a voltage divider rule, based on a connection relationship of the resistors 512, 514, 516, and 518.

The reference signal Vref may be adjusted by a first ADC scaler (the first ADC scaler 130 of FIG. 1, as a non-limiting example). The first ADC scaler may scale the reference signal Vref by applying a scale factor to the reference signal Vref. The scale factor of the first ADC scaler may be trained together with a weight of a neural network in a process of training the weight and may be determined. As described above, the first ADC scaler that is a scaler in an analog domain may be implemented to use the reference signal Vref, and the ADC circuit 500 may be replaced with, or implemented as, a quantizer, and thus the neural network apparatus of one or more embodiments may prevent an area cost from being incurred. By adjusting the reference signal Vref, the neural network apparatus of one or more embodiments may implement scaling in the analog domain even when an analog multiplier is not used.

Different voltages generated from the reference signal Vref and an analog output signal Vin (e.g., an analog voltage signal) of analog values output from a RAM (the RAM 110 of FIG. 1, as a non-limiting example) may be individually input to the comparators 522, 524, and 526. The comparators 522, 524, and 526 may compare the input analog voltage signal Vin to a reference voltage signal generated from the reference signal Vref and the resistors 512, 514, 516, and 518, and may output a high level output value or a low level output value according to a magnitude relationship.

Output values of the comparators 522, 524, and 526 may be transferred to the encoder 530. The encoder 530 may generate a digital output signal of digital values based on the output values of the comparators 522, 524, and 526. The encoder 530 may be configured with, for example, a combination of a full adder and an adder, and may convert the output values of the comparators 522, 524, and 526 into a binary code and output the binary code. A final digital output signal of the ADC circuit 500 may be generated by outputting the corresponding binary code as a parallel output.

Figure 6A:
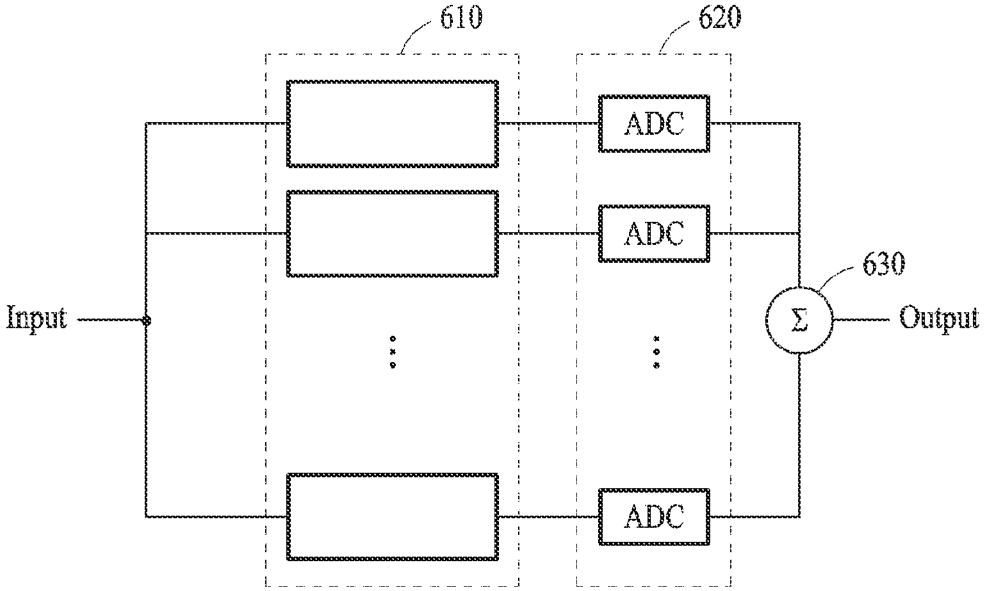
FIGS. 6A and 6B illustrate examples of deriving a scale factor based on a quantization scheme.
Figure 6B:
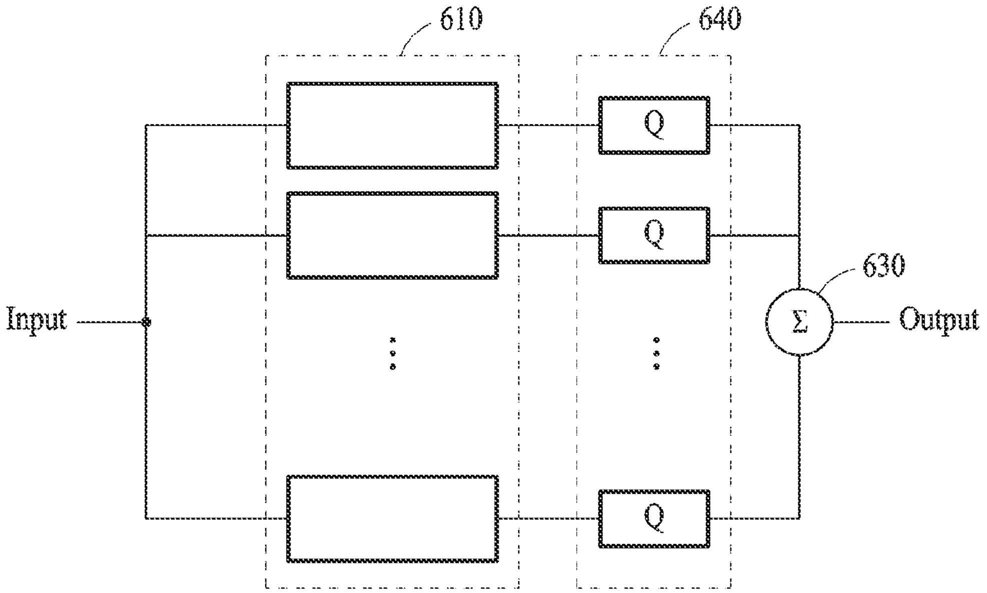

FIGS. 6A and 6B illustrate examples of deriving a scale factor based on a quantization scheme.

A method of determining a parameter (e.g., a scale factor) of each of a first ADC scaler (the first ADC scaler 130 of FIG. 1, as a non-limiting example) and a second ADC scaler (the second ADC scaler 140 of FIG. 1, as a non-limiting example) for optimizing performance of a neural network (e.g., a deep neural network (DNN)) implemented by a neural network apparatus (the neural network apparatus 100 of FIG. 1, as a non-limiting example) may be provided. By regarding a problem (e.g., an ADC reduction problem) for reducing an area of an ADC as a quantization problem, the method of one or more embodiments of determining the parameter may be used to optimize a precision of an ADC in a neural network apparatus having an RCA structure.

A first step may be a step of converting a neural network graph. In the first step illustrated in FIG. 6A, a neural network (e.g., a DNN) graph may be mapped to RCA blocks 610 and ADC blocks 620 to be converted. Partitioning of a weight matrix of a neural network into an RCA matrix may be referred to as "weight-to-RCA mapping", and the weight-to-RCA mapping may depend on, for example, a precision of a weight, a cell precision of a ReRAM, a size of an RCA, a dimension of a weight tensor, and/or a processing scheme of the weight. A fully-connected layer of the neural network may be mapped to the RCA blocks 610, as illustrated in FIG. 6A. Since the RCA blocks 610 process and output analog values, the ADC blocks 620 may be connected to the RCA blocks 610, and a summation block 630 for summing (or accumulating) digital values output from the ADC blocks 620 may be disposed behind the ADC blocks 620.

In a second step illustrated in FIG. 6B, the ADC blocks 620 may be replaced with quantizer (Q) blocks 640. In the second step, parameters may be optimized, and a quantization may be applied to the neural network graph converted in the first step. The quantizer blocks 640 may perform a function of simulating a first ADC scaler (the first ADC scaler 130 of FIG. 1, as a non-limiting example) and a second ADC scaler (the second ADC scaler 140 of FIG. 1, as a non-limiting example). The quantizer blocks 640 may quantize output values of the RCA blocks 610, and restore a scale of an input value. In the quantizer blocks 640, an operation may be performed, for example, as shown in Equation 1 below.

$$\hat{v} = v_Q \cdot s = \text{clip}\left(\left\lfloor \frac{v}{s} \right\rceil, 0, 2^b - 1\right) \cdot s \qquad \text{Equation 1}$$

In Equation 1, $v$ denotes an input value for a quantization, and $v_Q$ denotes a quantized input value. $\hat{v}$ denotes a result value obtained by performing the operation of Equation 1, and s denotes a parameter of a scale factor (or a step size). Also, b denotes a precision (a number of bits) of an ADC. $\lfloor \cdot \rceil$ denotes a round operation, and indicates an operation of clip(x, a, b)=min(max(x, a), b). The scale factor s may be determined through a training process of the neural network or other schemes (e.g., a statistical scheme). $v$ corresponding to an output signal (e.g., an output voltage of an analog value) of the RCA blocks 610 may be split by the scale factor s. The above-described process may be implemented by adjusting a reference voltage Vref (the reference voltage Vref of FIG. 5, as a non-limiting example) of an ADC circuit by a factor of "1/s" by the first ADC scaler. By adjusting the reference voltage Vref of the ADC circuit, scaling in an analog domain may be implemented even though an analog multiplier is not used.

In a third step, the quantized neural network may be re-mapped to an RCA-based neural network (e.g., an RCA-based accelerator). In the quantizer blocks 640, two scaling operations may be performed before and after the round operation of Equation 1. One of the two scaling operations may be a scaling operation (performed by the first ADC scaler) in the analog domain performed before the round operation, and the other scaling operation may be a scaling operation (performed by the second ADC scaler) in the digital domain performed after the round operation. Parameters of scale factors may be shared in all layers of the neural network, output channels, or each RCA structure. When the same scale factor is used in all layers, a scaling overhead may be reduced. The parameters of the scale factors may not necessarily be shared between the layers, and a scale factor of the first ADC scaler may have a unique value.

Figure 7:
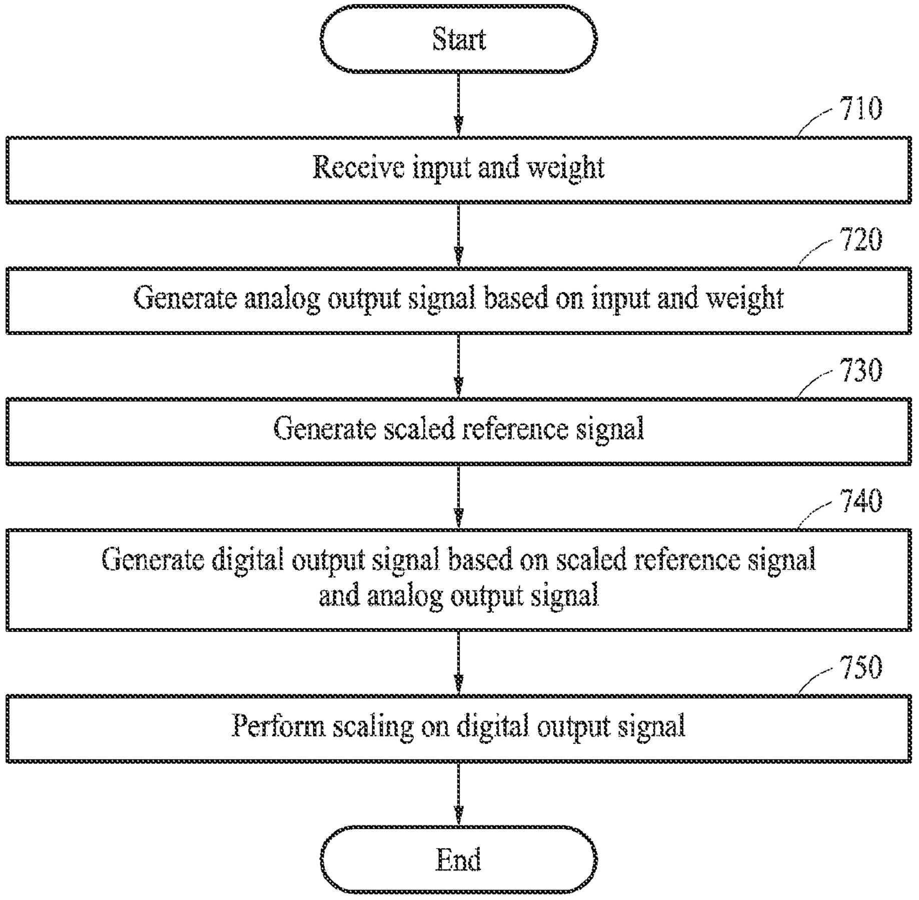
FIG. 7 is a flowchart illustrating an example of operations of a processing method performed by a neural network apparatus.

FIG. 7 is a flowchart illustrating an example of operations of a processing method performed by a neural network apparatus. The operations of the processing method may be performed by the neural network apparatus (the neural network apparatus 100 of FIG. 1, as a non-limiting example) described above.

Referring to FIG. 7, in operation 710, the neural network apparatus may receive an input and a weight. Each of the input and the weight may be quantized (or binarized) and split to correspond to a crossbar array structure of a RAM (e.g., the RAM 110 of FIG. 1).

In operation 720, the neural network apparatus may generate an analog output signal based on the input and the weight, using the RAM having the crossbar array structure. The RAM may generate partial sums of analog values generated by an operation between the input and the weight that are individually quantized and split.

In operation 730, the neural network apparatus may generate a reference signal scaled by dividing the reference signal by a scale factor in an analog domain, using a first ADC scaler (the first ADC scaler 130 of FIG. 1, as a non-limiting example). Here, the reference signal may correspond to a reference voltage that is to be compared to the analog output signal in an ADC circuit.

In operation 740, the neural network apparatus may generate, using the ADC circuit (the ADC circuit 120 of FIG. 1, as a non-limiting example), a digital output signal based on the reference signal scaled by the first ADC scaler, and the analog output signal of the RAM. The ADC circuit may convert partial sums of analog values into digital values to generate partial sums of the digital values, and accumulate the partial sums of the digital values to generate the digital output signal.

In operation 750, the neural network apparatus may perform, using a second ADC scaler (the second ADC scaler 140 of FIG. 1, as a non-limiting example), scaling on the digital output signal generated by the ADC circuit. The second ADC scaler may adjust the digital output signal by multiplying the digital output signal by the scale factor in a digital domain. According to a non-limiting example, the first ADC scaler and the second ADC scaler may have the same scale factor.

The neural network apparatuses, RAMs, ADC circuits, first ADC scalers, second ADC scalers, ReRAMs, DACs, crossbar array structures, sample-and-hold circuits, analog multipliers, ADC circuits, digital multipliers, resistors, comparators, encoders, RCA blocks, ADC blocks, summation blocks, quantizer blocks, neural network apparatus 100, RAM 110, ADC circuit 120, first ADC scaler 130, second ADC scaler 140, neural network apparatus 300, ReRAM 310, DACs 312, crossbar array structure 314, sample-and-hold circuits 316, analog multipliers 320, ADC circuits 330, digital multipliers 340, ADC circuit 500, resistors 512, 514, 516, and 518, comparators 522, 524, and 526, encoder 530, RCA blocks 610, ADC blocks 620, summation block 630, quantizer blocks 640, and other apparatuses, units, modules, devices, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An apparatus, the apparatus comprising:

a random-access memory (RAM) configured to generate an analog output signal based on an input and a weight of a neural network, the RAM including a crossbar array structure;

an analog-to-digital converter (ADC) circuit configured to generate a digital output signal based on a reference signal and the analog output signal of the RAM, the reference signal corresponding to a reference voltage for comparison with the analog output signal of the RAM during analog-to-digital conversion;

a first ADC scaler configured to scale the reference signal of the ADC circuit; and a second ADC scaler configured to scale the digital output signal generated by the ADC circuit, wherein the first ADC scaler is configured to adjust a reference voltage corresponding to the reference signal based on a scale factor in an analog domain, wherein the second ADC scaler is configured to adjust the digital output signal based on the scale factor in a digital domain, wherein the first ADC scaler and the second ADC scaler have a same scale factor.

2. The apparatus of claim 1, wherein, for the scaling of the reference signal, the first ADC scaler adjust the reference voltage by dividing the reference voltage by a scale factor in the analog domain.

3. The apparatus of claim 2, wherein, for the scaling of the digital output signal, the second ADC scaler adjust the digital output signal by multiplying the digital output signal by the scale factor.

4. The apparatus of claim 1, wherein, for the scaling of the reference signal, the first ADC scaler is configured to scale the reference signal by adjusting a reference voltage applied to resistors connected in series.

5. The apparatus of claim 1, wherein the second ADC scaler comprises a digital multiplier configured to output a result obtained by multiplying the digital output signal of the ADC circuit by a scale factor.

6. The apparatus of claim 1, wherein the ADC circuit comprises a plurality of comparators to which the analog output signal and different reference signals are input, and each of the comparators is configured to output a binarized output value based on a comparison result between the analog output signal and the reference signal.

7. The apparatus of claim 1, wherein the input and the weight are individually quantized and split to correspond to the crossbar array structure of the RAM.

8. The apparatus of claim 7, wherein, for the generating of the analog output signal, the RAM is configured to generate partial sums of analog values generated by an operation between the input and the weight that are individually quantized and split.

9. The apparatus of claim 8, wherein, for the generating of the digital output signal, the ADC circuit is configured to:

convert the partial sums of the analog values into digital values to generate partial sums of the digital values; and accumulate the partial sums of the digital values to generate the digital output signal.

10. The apparatus of claim 1, wherein a scale factor of the first ADC scaler and a scale factor of the second ADC scaler are derived by a quantization scheme.

11. A processor-implemented method, the method comprising:

receiving an input and a weight of a neural network;

generating, using a random-access memory (RAM) including a crossbar array structure, an analog output signal based on the input and the weight;

generating, using an analog-to-digital (ADC) circuit, a digital output signal based on a reference signal scaled by a first ADC scaler and the analog output signal of the RAM, the reference signal corresponding to a reference voltage for comparison with the analog output signal of the RAM during analog-to-digital conversion; and performing, using a second ADC scaler, scaling on the digital output signal generated by the ADC circuit, wherein the first ADC scaler is configured to adjust a reference voltage corresponding to the reference signal based on a scale factor in an analog domain, wherein the second ADC scaler is configured to adjust the digital output signal based on the scale factor in a digital domain, wherein the first ADC scaler and the second ADC scaler have a same scale factor.

12. The method of claim 11, further comprising:

generating, using the first ADC scaler, the scaled reference signal by dividing the reference signal by a scale factor in the analog domain.

13. The method of claim 11, wherein the performing of the scaling on the digital output signal comprises adjusting the digital output signal by multiplying the digital output signal by a scale factor.

14. The method of claim 11, wherein the generating of the analog output signal comprises generating partial sums of analog values generated by an operation between the input and the weight that are individually quantized and split.

15. The method of claim 14, wherein the generating of the digital output signal comprises:

converting the partial sums of the analog values into digital values to generate partial sums of the digital values; and accumulating the partial sums of the digital values to generate the digital output signal.

16. A non-transitory computer-readable storage medium storing instructions that, when executed by one or more processors, configure the one or more processors to perform the method of claim 11.

17. An apparatus, the apparatus comprising:

a neural processor configured to:

generate an analog output signal based on an input and a weight of a neural network;

scale a reference signal corresponding to a reference voltage for comparison with the analog output signal during analog-to-digital conversion;

generate a digital output signal based on the scaled reference signal and the analog output signal; and scale the digital output signal, wherein the neural processor configured to scale the reference signal by adjusting a reference voltage corresponding to the reference signal based on a scale factor in an analog domain and scale the digital output signal by adjusting the digital output signal based on the scale factor in a digital domain, and wherein, for the scaling of the reference signal and the digital output signal, the neural processor is configured to scale the reference signal and the digital output signal by a same scale factor.

18. The apparatus of claim 17, wherein, for the generating of the analog output signal, the neural processor comprises a random-access memory (RAM), including a crossbar array structure, configured to generate the analog output signal, and for the generating of the digital output signal, the neural processor comprises an analog-to-digital converter (ADC) circuit configured to generate the digital output signal.

19. The apparatus of claim 17, wherein the weight is a trained weight trained based on the scale factor.

* * * * *